(12) United States Patent
Iyengar (10) Patent No.: US 6,385,607 B1
(45) Date of Patent: May 7, 2002

(54) GENERATING REGRESSION TREES WITH OBLIQUE HYPERPLANES

(75) Inventor: Vijay Sourirajan Iyengar, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,870

(22) Filed: Mar. 26, 1999

(51) Int. Cl.[7] ............................................... G06F 17/30
(52) U.S. Cl. ......................................... 707/5; 707/100
(58) Field of Search .............................. 707/1, 102, 5; 434/362

(56) References Cited

U.S. PATENT DOCUMENTS

| | | | | |
|---|---|---|---|---|
| 5,381,513 A | * | 1/1995 | Tsuboka | 395/2.41 |
| 5,787,274 A | * | 7/1998 | Agrawal et al. | |
| 6,144,838 A | * | 11/2000 | Sheehan | 434/362 |
| 6,148,303 A | * | 11/2000 | Morimoto et al. | 707/12 |

OTHER PUBLICATIONS

"Linear Regression in Regression Tree Leaves", A. Karalic, Jozef Stefan Institute, Jamova 39, 61111 Ljubljana, Slovenia, Jun. 1992, pp. 1–11.*

"Linear Regression in Regression Tree Leaves", A. Karalic, Jozef Stefan Institute, Jamova 39, 61111 Ljubljana, Slovenia, Jun. 1992, pp. 1–11.

"Classification and Regression Trees", Breiman, Friedman, Olshen and Stone, pp. 216–265.

\* cited by examiner

*Primary Examiner*—Hosain T. Alam
*Assistant Examiner*—Tam V Nguyen
(74) *Attorney, Agent, or Firm*—Louis P. Herzberg (57) ABSTRACT

A method and apparatus is disclosed for generating a regression tree with oblique hyperplanes from a training set of records. The method is performed iteratively, stopping when a criterion has been reached. A new set of vectors is computed as the iteration proceeds. The vectors used are not restricted to the attribute axes and hence oblique hyperplanes are allowed to split nodes in the generated regression tree. Generally, the computation of the new vector set uses the regression tree produced in the latest iteration. The leaf nodes of this tree are considered pair-wise to compute the new vector set for use in the next iteration. The iterative process produces a set of regression trees from which a best tree is chosen as the final result of the method.

39 Claims, 5 Drawing Sheets

GENERATING REGRESSION TREES WITH OBLIQUE HYPERPLANES

CROSS REFERENCES

The present application is related to the following application even dated herewith: Docket number Y0999-085, entitled, "Generating Decision-Tree Classifiers With Oblique Hyperplanes," by inventor Vijay Iyengar, which is incorporated herein by reference in entirety.

FIELD OF THE INVENTION

This invention relates to the field of data processing. It is more specifically directed to the field of computer data mining. More particularly, the invention relates to methods and apparatus for generating a regression tree with oblique hyperplanes from data records.

BACKGROUND OF THE INVENTION

Data mining is the search for valuable information from data. Regression is a form of data mining in which relationships are learned between a set of attributes and a dependent variable. This dependent variable is sometimes referred to as a continuous label to contrast it with the discrete labels in the case of classification. The learnt relationships are then used to predict the value for the dependent variable given values for the set of attributes. Various phenomena can be represented by such relationships. Examples of such phenomena can be found in the financial domain, insurance domain and in the medical domain. The dependence of the total claim amount from an automobile insurance policy on various characteristics like age of drivers, type of car, geographical location, driving history and so on is an example of a phenomena. The characteristics like age and type of car are attributes. In the medical domain, dependence of a diabetic patient's blood glucose test results on amount of insulin taken, food consumed and exercise performed is another example of a phenomena.

The process of generating a regression model uses input data, herein referred to as a training set, which includes multiple records. Each record has values for various attributes, and has a value for the dependent variable. The number of attributes are referred to as the dimensionality of the attribute space. Generally each attribute is also referred to as a dimension. Attributes can be categorical or numeric in nature.

This invention relates to numeric attributes. Regression has wide applications in various domains.

Regression has been studied extensively within several disciplines, including statistics and machine learning. Known regression techniques include statistical algorithms, regression trees, and neural networks. The desired qualities for a regression model include prediction accuracy, speed of model generation and understandability, and intuitiveness of the result.

The tree based method is chosen as a basis for this invention because of its superior speed of model generation and scalability to high dimensional problems with large training sets. Regression trees can be separated into two forms depending on the nature of the test at each node of the tree. The simplest form of regression trees has a test of the form ($x_i \leq b$), where $x_i$ is the value in the i-th numeric dimension and b is some constant. A more complex form of regression tree allows linear combinations of the attributes in the test at each node. In this case, the test is of the form $$(a_1.x_1 + a_2.x_2 + \ldots + a_n.x_n \leq b).$$

These trees, also called oblique trees or trees using oblique hyperplanes, produce better results for some problem domains. This was discussed and demonstrated for classification in "Classification and Regression Trees," Breiman et. al., Chapman and Hall/CRC, 1984, which is hereinafter referred to as "CART". When applicable, oblique trees produce compact solutions with higher accuracy. While these are advantageous, the generation of these oblique trees is difficult because of the difficulty in determining the equation for the complex test at each node.

Oblique tree generation methods have been proposed for classification. Some of these oblique tree generation methods use a particular form of an optimization technique to determine the test at each node. These methods are complex and tend to be computationally intensive without any guarantee of improved accuracy.

SUMMARY OF THE INVENTION

It is therefore an aspect of the present invention to present a method and apparatus for generating a regression tree with oblique hyperplanes from data records. In an embodiment, the regression tree is generated using an iterative method wherein for each iteration a set of vectors is provided to a regression tree generating process. The regression tree generated uses hyperplanes orthogonal to the vectors provided in the set to separate records at each of its node. The iterative process starts out with the set of numeric attribute axes as the set of vectors. At the end of each iteration, pairs of leaf nodes in the generated tree are considered and analyzed to determine new vectors. The set of vectors for the next iteration is determined using a filter process. This iterative process generates multiple regression trees from which one tree is chosen as a solution meeting a particular criteria.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

This invention provides a method and apparatus for generating a regression tree with oblique hyperplanes from data records. The invention includes an iterative method for generating such trees which is relatively computationally inexpensive and provides more accurate and intuitively understandable solutions for many problems.

In an example embodiment of the invention, the iterative method starts out with the numeric attribute axes as a starting set of vectors and uses the hyperplanes orthogonal to these vectors in the regression tree generating process. Any regression tree generating process may be used or adapted for this task. The resultant tree is used to generate a new set of vectors. Computation of the new set of vectors is performed using the leaf nodes in the tree generated in the latest iteration. Pairs of leaf nodes are considered and analyzed to determine one or more new vectors. The resulting vectors are filtered to get a new set that is then used for the next iteration. This iterative process continues until a stopping criteria is reached. When the process stops, one of regression trees generated in one of the iterations of this method is chosen as a final solution.

Figure 1:
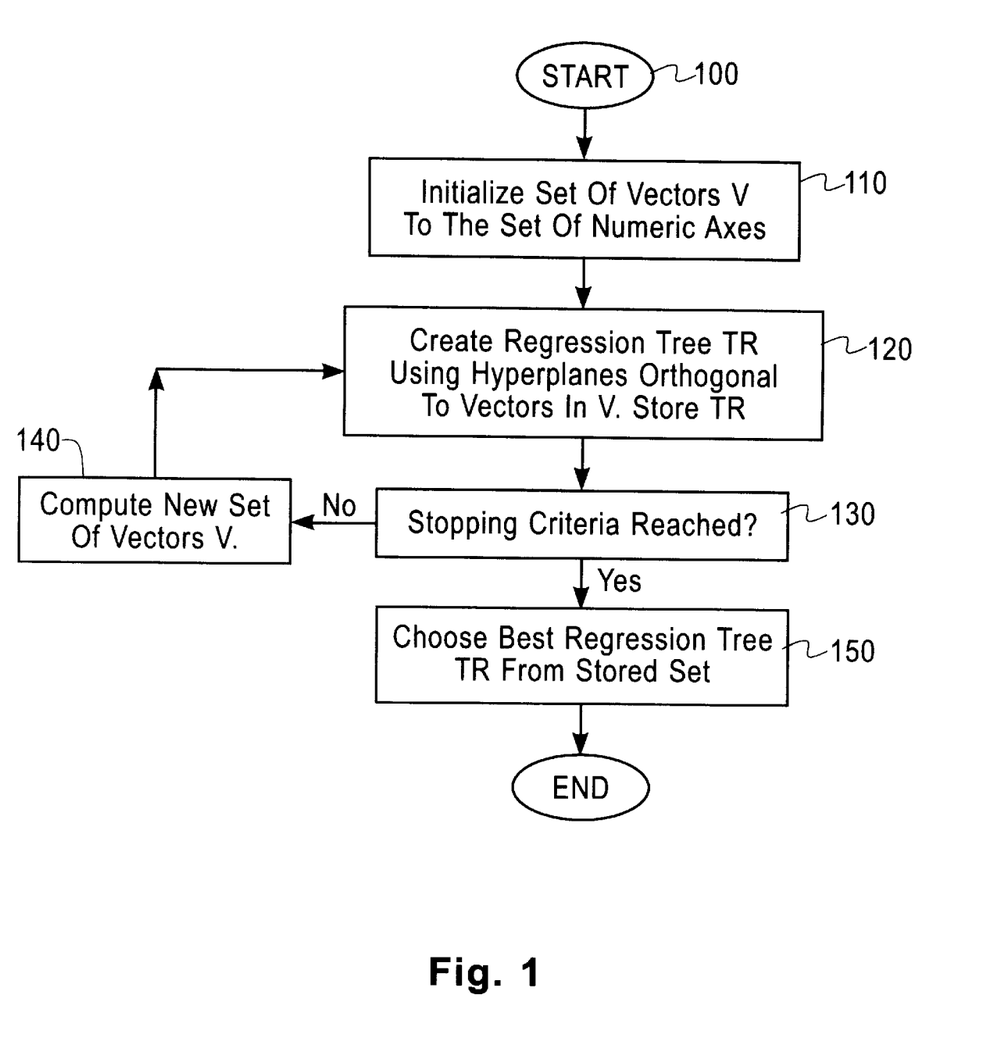
FIG. 1 shows is a flow chart showing the overall operation of a method of the present invention.

FIG. 1 shows a flow diagram for an example method for generating a regression tree using oblique hyperplanes.

Beginning with start block 100, the method first forms an initial set of vectors 'V' 110. Each vector in n-dimensional numeric attribute space is specified by an equation of the form $$(c1.x1+c2.x2 \ldots +cn.xn),$$

where $$(c1, c2, \ldots cn)$$

are the coefficients for coordinates along each of the numeric axes $$(x1, x2, \ldots, xn),$$

respectively. Scaling all the coefficients by multiplying all of them by a constant does not change the vector. Hence, the coefficients are scaled such that the sum of their absolute values is 1. Alternate embodiments employ other scalings to obtain other properties without affecting this invention.

A vector is useful in defining a family of hyperplanes that are orthogonal to it. The initial set 'V' created in block 110 contains one vector for each of the numeric axes. Hence, this initial set 'V' has 'n' vectors in it where each vector has exactly one coefficient with value '1', and all the other coefficients have value '0'. Each vector in the initial set 'V' has a non-zero coefficient 'ci' for the coordinate 'xi' along a unique numeric attribute. At block 120, the hyperplanes orthogonal to each of the vectors in the set V are used to create a regression tree 'TR'.

Figure 2:
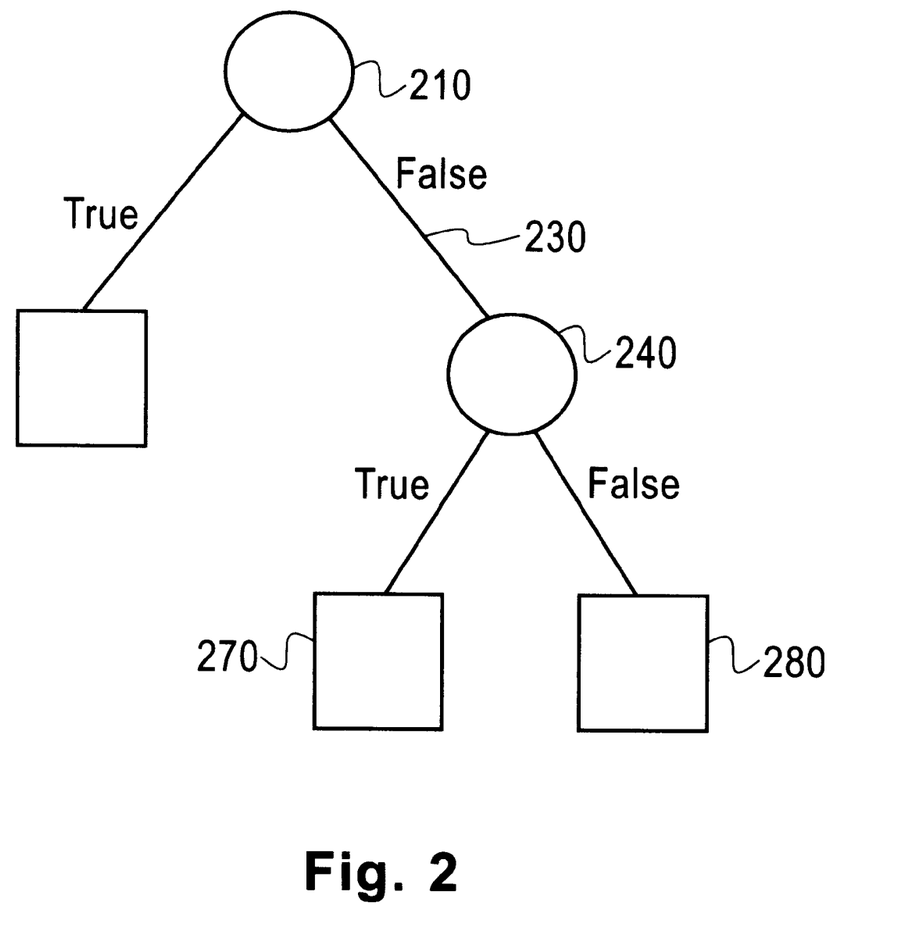
FIG. 2 illustrates an example of a regression tree where each leaf node represents a specific function to determine the value of the dependent variable.

An example of a regression tree 'TR' is illustrated in FIG. 2. The regression tree consists of nodes and branches, such as internal node 240 and branch 230. Each node makes a single test wherein an outcome can be either true or false. The outcome leads to the corresponding child node. For example, when node 240 is tested, it leads to node 270 if true, or node 280 if false. Node 240 is said to be split into nodes 270 and 280. The starting node 210 is referred to as the root node of the tree. Following along the branches of the tree based on the outcome of the test at each node, a leaf or terminal node is ultimately reached. For example, tests at nodes 210 and 240 terminate at leaf node 280. The leaf node reached, for example node 280, determines the function to be used to determine the dependent value.

In one embodiment, the mean value of the dependent variable over the training records in the leaf node reached is used as the determined dependent value. In another embodiment, a distinct linear equation is derived for each leaf node to determine the dependent value when that particular leaf node is reached. The statistical method of linear regression is one way to get the distinct linear equation for each leaf node. Other complex functions are also possible to determine the dependent variable value at each leaf node.

Trees that use oblique hyperplanes allow tests at each node of the form $$(a1.x1+a2.x2 \ldots +an.xn \leq b),$$

where $$a1,a2, \ldots an, \text{ and } b$$

are numeric constants. A regression tree built in block 120 of FIG. 1 is allowed to use any of the vectors in the set V for the test in any tree node. Therefore the constants $$(a1,a2 \ldots, an)$$

in the test at each node are the set of coefficients $$(c1,c2, \ldots, cn)$$

of the vector chosen at that node. The constant b is chosen by the procedure used in block 120 to create a regression tree.

One embodiment of block 120 uses the method for generating regression trees called CART as described in Chapter 8 of *Classification and Regression Trees*, by Brieman et. al Chapman & Hall/CRC, 1998, which is incorporated herein by reference in entirety. Other embodiments are possible for block 120, wherein any method for generating regression trees can be used in the procedure. The only requirement for the method used in block 120 is that it should be adaptable to apply oblique hyperplanes orthogonal to a given set of vectors to split nodes. For example, the regression tree method as described by A. Karalic in *Employing Linear Regression in Regression Tree Leaves*, Proceedings of ISSEK'92 (International School for Synthesis of Expert Knowledge) Workshop, Bled, Slovenia, 1992, can be used in block 120, by allowing hyperplanes orthogonal to a given set of vectors to be used to split nodes in the tree.

The creation of a regression tree in block 120 can use one of many forms of regression error for each record known to those skilled in the art. For example, in one embodiment, the squared difference between the actual value and the predicted value for the dependent variable is used as the regression error. In another embodiment, the absolute difference between the actual value and the predicted value for the dependent variable is used as the regression error.

At block 130 of FIG. 1, a check is made to see if the stopping criteria has been reached. One embodiment for block 130 uses a user specified limit on the number of iterations through blocks 120, 130 and 140. Typical values for this limit are less than 5. Another embodiment for block 130 uses regression error and/or tree size achieved in each iteration to determine when to stop the iteration. For example, worsening of these quantities by some user specified amount is sometimes used as a stopping criteria.

Figure 3:
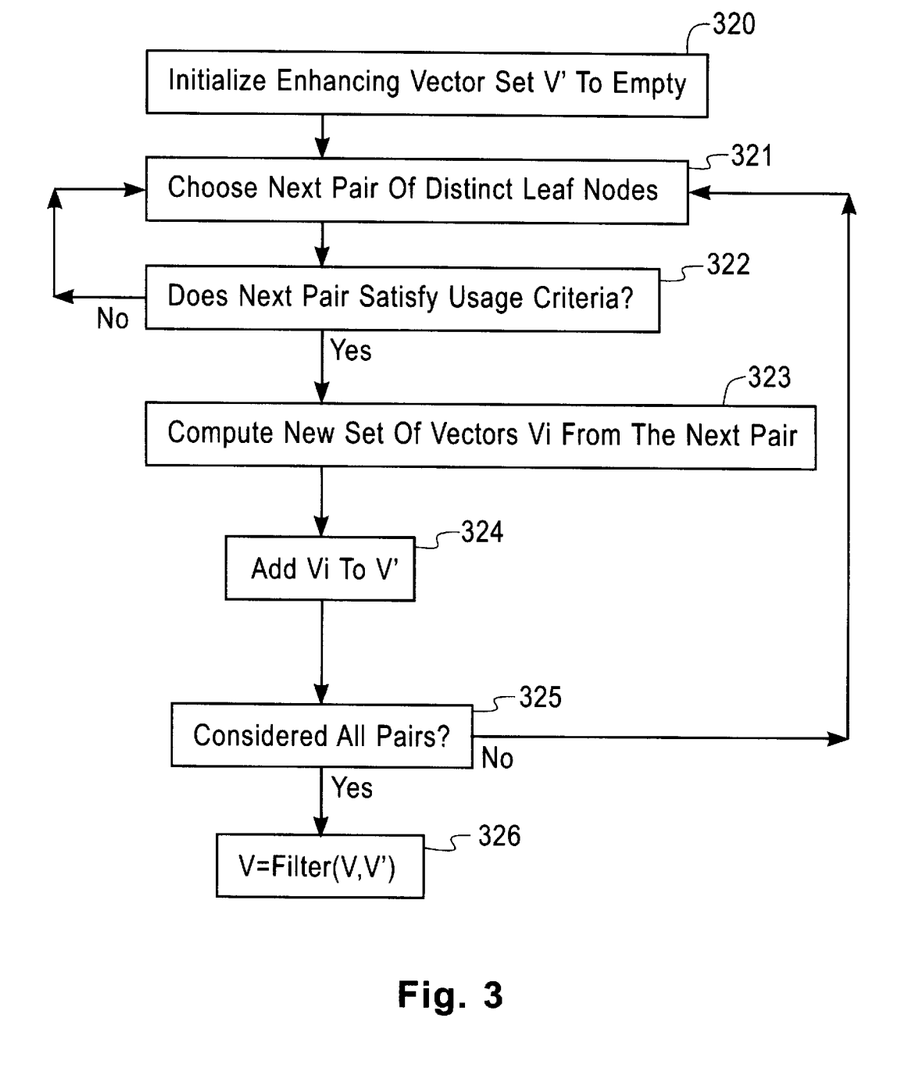
FIG. 3 is a flow chart showing the operation of an example embodiment for block 140 of FIG. 1, for the computation of a new set of vectors V.

At block 140 of FIG. 1, a new set of vectors V is calculated for use in the next iteration. FIG. 3 shows an embodiment for block 140 in FIG. 1. The computation of the new set of vectors V begins at block 320 in FIG. 3 with a vector set V' being initialized to being empty. The set V' as defined herein is referred to as the enhancing vector set. In block 321, a new pair Pi of distinct leaf nodes (Lj, Lk) is chosen from the regression tree 'TR' generated in the last iteration. If there are m leaf nodes in 'TR', there are $$(m \times (m-1))/2$$

possible distinct pairs to consider.

At block 322 in FIG. 3, a check is made to see if the chosen pair of leaf nodes Pi=(Lj, Lk) satisfies the criteria for being used in the new vector set computation. In general, the usage criteria for the check in block 322 can use any characteristic for leaf nodes Lj and Lk.

A particular embodiment for this step of checking is based on the number of training records Nj and Nk covered in the leaf nodes Lj and Lk, respectively. Nj and Nk are also referred to as the size of the leaf nodes Lj and Lk, respectively. A pair (Lj, Lk) can fail the check if either Nj or Nk is smaller than some user defined threshold size, SIZE1. A pair (Lj, Lk) can also fail the check if both Nj and Nk are smaller than another user defined threshold size, SIZE2.

Another embodiment uses a function that determines whether or not Lj and Lk are adjacent. It requires that Lj and Lk be adjacent to satisfy the check in block 322. Various forms of adjacency can be used. One embodiment considers two leaf nodes Lj and Lk adjacent, if their boundaries share at least one point in the multidimensional attribute space. This is determined using linear programming to solve the constraints for the space defined by each leaf node Lj, Lk. The set of constraints for each leaf node are determined by traversing the path from the root of the tree to the leaf node and adding the constraint due to the test at each encountered node to the set of constraints. If a node with the test (a1.x1+a2.x2 . . . +an.xn≦b)

is encountered and the test is successful in this traversal, then the constraint (a1.x1+a2.x2 . . . +an.xn≦b)

is added to the set of constraints. If a node with the test (a1.x1+a2.x2 . . . +an.xn≦b)

is encountered with the test failing in this traversal, then the constraint (a1.x1+a2.x2 . . . +an.xn≧b)

is added to the set of constraints. Various embodiments are possible by combining size checks with checks of adjacency. A distance measure can be defined between the leaf nodes and used as a usage criteria. For example, a leaf node pair would be used only if the distance measure between them was below a user defined threshold.

At block 323 in FIG. 3, a set of vectors Vi is computed from the pair of leaf nodes Pi=(Lj, Lk). Vi as defined herein is referred to as a separating set of vectors. In general, this computation has the form Vi=compute_vectors(Lj, Lk), where compute_vectors is a function that uses characteristics of leaf nodes Lj and Lk. One embodiment computes one vector v from each pair (Lj, Lk) as follows. Considering the leaf node Lj, the training records covered by Lj are collected in a set R. For all the numeric attribute dimensions the averages of the coordinates of the training records in R in each of the dimensions are calculated as (g1,g2, . . . gn).

Let (h1,h2, . . . ,hn) be the computed values for Lk using the same method. The single vector v in Vi is computed by taking the difference between the averages (g1−h1, g2−v2, . . . ,gn−vn).

Another embodiment uses only a subset of the training records covered by a leaf node in the computation of the averages.

Another embodiment uses the boundaries for Lj and Lk, as described in the embodiments for block 322, to determine the geometric centers (q1,q2, . . . ,qn)

and (r1,r2, . . . ,rn)

for Lj and Lk, respectively and then computing the vector v as (q1−r1,q2−r2, . . . ,qn−rn).

One method of approximating the geometric center is to average the coordinates of uniformly placed records in the leaf nodes Lj and Lk.

Other example embodiments compute a vector v first as described above, and then use a significance test to determine which coefficients of v are not significant. These insignificant coefficients are forced to be zero and then the resultant vector v is added to Vi. Combinations of these methods are also used to generate multiple vectors in Vi. Alternatively, coefficients of a computed vector v can be perturbed by small amounts to generate other vectors in Vi. The separating vector set Vi is combined with the enhancing set of vectors V' in block 324 to generate the adjusted set of vectors.

Block 325, FIG. 3, ensures that all pairs of distinct leaf nodes have been considered before going to block 326. In block 326 a filtering process is applied to generate the set of vectors V. In an example embodiment, the filter function in block 326 uses the last set of vectors V and the newly generated vector set V' to generate the set of vectors V for the next iteration. In general, this function can use any characteristic of the vectors and the vector sets V and V' to generate the modified vector set V.

An advantageous embodiment adds the sets V and V' to generate the new vector set V. Another embodiment first removes from V all vectors except those that correspond to the numeric attribute axes. It then adds the vectors from V' to V. Still another embodiment includes additional filtering using a measure of redundancy such that if two vectors have very similar coefficients only one representative vector remains to represent both of them. Filtering can also include reinitializing the set of vectors to some predetermined set.

The iterative procedure shown in FIG. 1, uses the modified set of vectors newly calculated to create a modified regression tree in block 120 which is generally stored. This iterative procedure continues until the criterion for stopping is satisfied.

At block 150 in FIG. 1, the regression trees 'TR' created and stored in block 120 inside the iterative loop are examined and one of them is selected. One embodiment for these steps of examining and selecting is based on using a separate set of records called the validation set. The accuracy and tree size on this validation set of records is used to choose the best regression tree. In the absence of a validation set, the accuracy and tree size on the training set of records is used.

A generated regression tree can be applied to unseen records with values for the attributes to predict the corresponding value for the dependent variable. This is done for each record by starting at the root of the regression tree and traversing nodes by performing the tests at each node until a leaf node is reached. Once the leaf node reached is determined the function associated with the leaf node reached is then used to compute the value of the dependent variable predicted for this record.

In one embodiment, the function used at a leaf node is the mean value for the dependent variable, where the mean is taken over all the training records contained in the leaf node reached. In another embodiment, the function used is a linear function of the numeric attributes. The linear function can be determined using the statistical method of linear regression over the training records contained in the leaf node reached.

Figure 4:
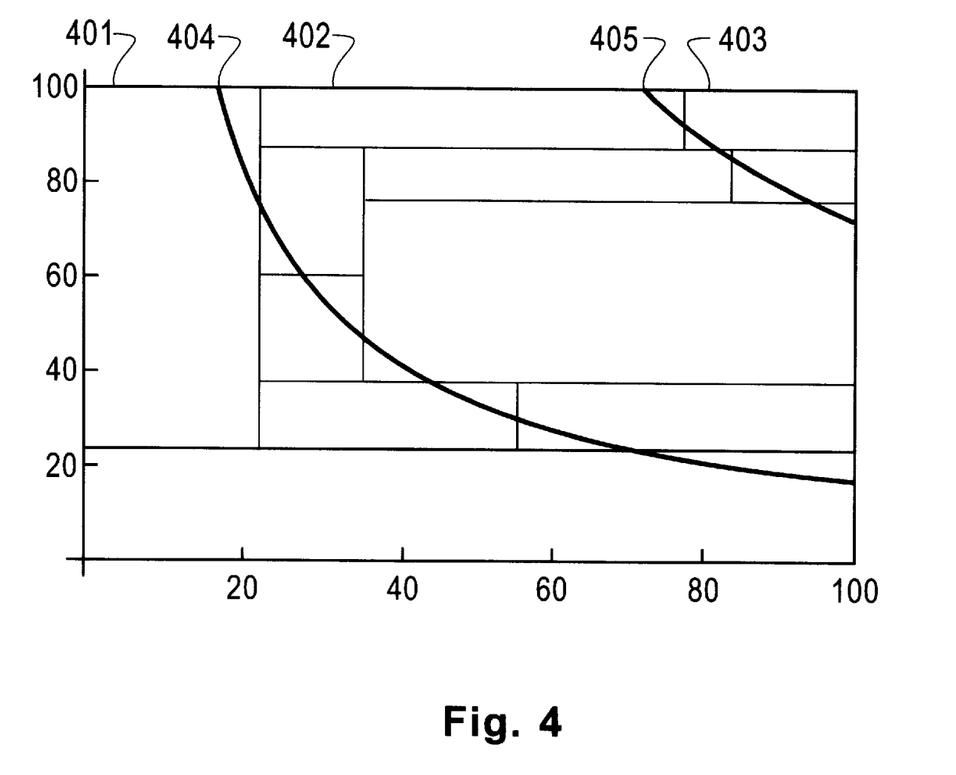
FIG. 4 illustrates results obtained on an example data set employing a regression tree using hyperplanes orthogonal to the attribute axes to split at each node in the tree.
Figure 5:
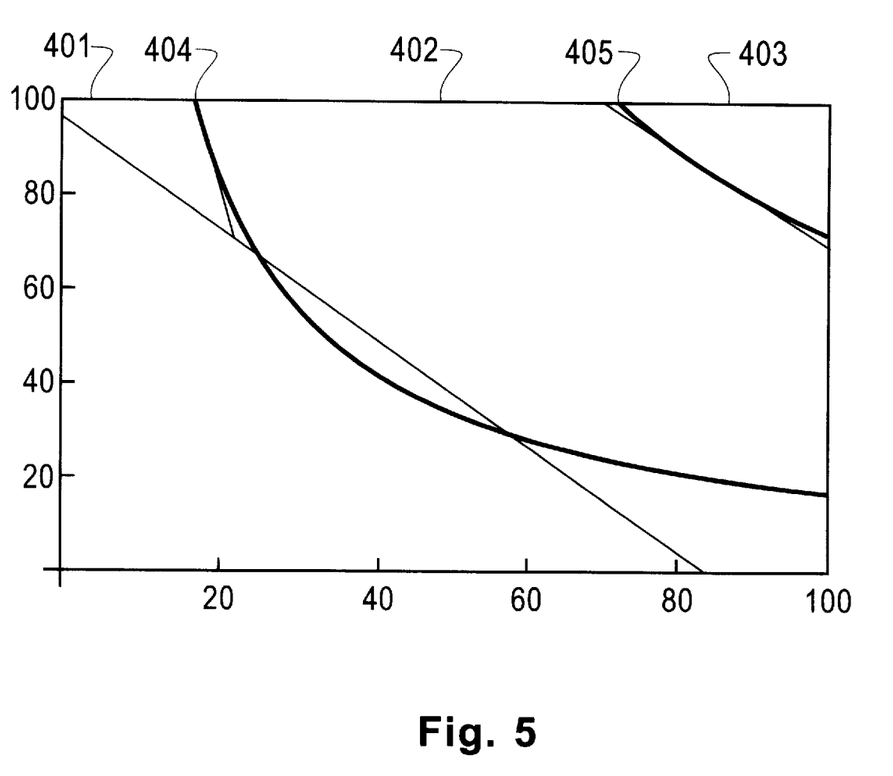
FIG. 5 illustrates results obtained on the example data set of FIG. 4 employing a regression tree using oblique hyperplanes in accordance with the present invention.

FIGS. 4 and 5 show results obtained from an example data set without and with using the method of the present invention respectively. This example data set is assumed to have two numeric attribute dimensions with values in the range 0 to 100. The value of the dependent variable can be represented as the sum (w+e) of two parameters w and e. Two thick contour lines 404 405 separate the three areas 401–403 of the two dimensional space in both FIGS. 4 and 5. Contour line 404 separates the first area 401 from the second area 402. Contour line 405 separates the second area 402 from the third area 403. The value of the dependent variable parameter w for two of the areas, 401 and 403, is 2.5. The value of the parameter w is 7.5 for the third area 402. The parameter e represents noise and is a random variable with a normal distribution that has a zero mean value and a standard deviation of 2.5 in all three areas 401, 402, and 403. There are 2555 training records is this two dimensional space which are not explicitly shown for clarity.

FIG. 4 illustrates results obtained on the example data set employing a regression tree using only hyperplanes that are orthogonal to the attribute axes to split the data set at each node in the tree. FIG. 4 shows these results as a plurality of rectangular regions enclosed by thin solid lines. Each thin solid line is orthogonal to one of the attribute axes. The thin solid lines enclosed rectangular regions which correspond to a leaf node in the resultant tree. In this example the predicted value of the dependent variable in each region is chosen to be the average of the dependent values for all the training records contained in the region. This provides a regression solution which approximates the areas separated by the thick contour lines 404 405 using a staircase-like pattern along the thin solid lines of the rectangular regions. The resultant mean square error is 6.98 on a separate test set containing 2445 records.

FIG. 5 illustrates results on the same example data set of FIG. 4 employing a regression tree allowing the use of oblique hyperplanes in accordance with the present invention. The regions corresponding to the leaf nodes are again enclosed by thin solid lines shown in the figure. Unlike the case in FIG. 4 these thin solid lines are not constrained to be orthogonal to an attribute coordinate axis. These thin solid lines are allowed to be oblique in accordance with the present invention. The resulting regression tree using these oblique hyperplanes has five leaf nodes which result in five corresponding regions in FIG. 5. It is clear from FIG. 5 that the regions in this regression tree solution approximate the areas 401–403 separated by the thick contour lines 404 405 much better than the solution shown in FIG. 4. This is also reflected in an improved mean square error of only 6.37 on same test set of FIG. 4.

It is noted that although the description of the invention is made for particular arrangements of steps, the intent and concept of the present invention are suitable and applicable to other arrangements. Thus the invention may be implemented with an article of manufacture comprising a computer usable medium having computer readable program code means embodied therein for causing the generation of a regression tree from a training set of records. The computer readable program code means in the article of manufacture comprising computer readable program code means for causing a computer to effect the methods of the present invention. The invention may be implemented with a program storage device readable by machine, tangibly embodying a program of instructions executable by the machine to perform method steps for generating a regression tree from a training set of records. Similarly, the invention may be implemented with a computer program product comprising a computer usable medium having computer readable program code means embodied therein for causing generation of a regression tree. The computer readable program code means in the computer program product comprising computer readable program code means for causing a computer to effect the methods of the present invention. It will thus be clear to those skilled in the art that other modifications to the disclosed embodiments can be effected without departing from the spirit and scope of the invention.

What is claimed is:

1. A method for forecasting a phenomenon, said method comprising:

providing a training set of records, each record having at least one attribute and a numeric value for a dependent variable representing a phenomenon;

forming an initial set of vectors of said at least one attribute;

applying hyperplanes which are orthogonal to the initial set of vectors to obtain a first regression tree for at least one subset of the training set;

testing whether the first regression tree meets a criterion; if criterion is not met:

calculating for at least a subset of pairs of leaf nodes on the first regression tree a modified set of vectors;

creating a modified regression tree from the modified set of vectors; and forecasting the phenomenon employing a predicted value for said dependent variable by applying said modified regression tree to new values for said at least one attribute.

2. A method as recited in claim 1, further comprising:

storing the modified regression tree;

testing whether the modified regression tree meets the criterion; and repeating the steps of calculating, creating, storing and testing until the modified regression tree meets the criterion.

3. A method as recited in claim 2, further comprising:

examining each of the stored regression trees for a desired property, and selecting a best regression tree based on the results of the step of examining.

4. A method as recited in claim 1, further comprising employing the squared difference between an actual value and the predicted value for the dependent variable as a regression error implementing an application forecasting the phenomenon.

5. A method as recited in claim 1, wherein the step of forming employs one vector for each attribute, said one vector having a non-zero coefficient only for values of said each attribute.

6. A method as recited in claim 1, wherein the step of applying employs a method based on CART.

7. A method as recited in claim 1, wherein the criterion is a measure of a regression error.

8. A method as recited in claim 1, wherein the criterion is a resulting size of one of the regression trees.

9. A method as recited in claim 1, wherein the step of testing is performed on records in the training set not included in said at least one subset.

10. A method as recited in claim 1, wherein the step of calculating includes;
   (a) initializing an enhancing vector set to empty;
   (b) choosing a next pair of distinct leaf nodes;
   (c) determining if the next pair satisfies a usage criterion;
   (d) repeating steps (b) and (c) until the usage criterion is satisfied;
   (e) computing a separating set of vectors for the next pair;
   (f) combining the separating set of vectors to the enhancing set of vectors forming an adjusted set of vectors;
   (g) repeating steps (b) through (f) for all pairs of leaf nodes; and
   (h) filtering all sets of vectors so as to form the modified vector set.

11. A method as recited in claim 10, wherein the usage criterion is a minimum size for each leaf in the pair of leaf nodes.

12. A method as recited in claim 10, wherein the usage criterion employs distance between the leaf nodes forming the pair.

13. A method as recited in claim 10, wherein the step of computing includes:
   calculating an average of coordinates for each leaf of the pair of leaf nodes; and
   computing each separating vector as being a difference of the average between one leaf and the other leaf in the pair of leaf nodes.

14. A method as recited in claim 13, wherein the step of calculating an average is performed on a portion of the training records.

15. A method as recited in claim 10, wherein the step of filtering performs set addition.

16. A method as recited in claim 1, wherein at least one attribute is numeric.

17. A method as recited in claim 1, wherein the phenomenon is insurance related.

18. A method as recited in claim 17, wherein the phenomenon is a relation between the dependent variable, total insurance claim amount over some period of time, and various characteristics of an entity making the insurance claim.

19. A method as recited in claim 1, wherein the step of applying uses as a regression error a squared difference between actual and predicted values for the dependent variable.

20. A method as recited in claim 1, wherein the step of applying uses as a regression error an absolute difference between actual and predicted values for the dependent variable.

21. A method as recited in claim 4, wherein the step of applying includes;
   determining a leaf node reached in said one of the regression trees for each set of new values for said at least one attribute; and
   using a function for the leaf node reached to compute the predicted value of the dependent variable
   for each set of new values for said at least one attribute.

22. A method as recited in claim 21, wherein the function used at a leaf node reached is the mean value for the dependent variable over all the training records in the leaf node reached.

23. A method as recited in claim 21, wherein the function used at a leaf node reached is a linear function of said at least one attribute determined by using the statistical method of linear regression over the training records contained in the leaf node reached.

24. An article of manufacture comprising a computer usable medium having computer readable program code means embodied therein for causing forecast of a phenomenon, the computer readable program code means in said article of manufacture comprising computer readable program code means for causing a computer to effect:
   providing a training set of records, each record having at least one attribute and a numeric value for a dependent variable representing a phenomenon;
   forming an initial set of vectors of said at least one attributes;
   applying hyperplanes which are orthogonal to the initial set of vectors to obtain a first regression tree for at least one subset of the training set;
   testing whether the first regression tree meets a criterion; if criterion is not met:
   calculating for at least a subset of pairs of leaf nodes on the regression tree a modified set of vectors;
   creating a modified regression tree from the modified set of vectors; and
   forecasting the phenomenon employing a predicted value for said dependent variable by applying said modified regression tree to new values for said at least one attribute.

25. An article of manufacture as recited in claim 24, the computer readable program code means in said article of manufacture further comprising computer readable program code means for causing a computer to effect:
   storing the modified regression tree;
   testing whether the modified regression tree meets the criterion; and
   repeating the steps of calculating, creating, storing and testing until the modified regression tree meets the criterion.

26. An article of manufacture as recited in claim 25, the computer readable program code means in said article of manufacture further comprising computer readable program code means for causing a computer to effect:
   choosing a best regression tree by examining each of the stored regression trees for a desired property, and
   selecting a best regression tree based on the results of the step of examining.

27. An article of manufacture as recited in claim 25, the computer readable program code means in said article of manufacture further comprising computer readable program code means for causing a computer to effect applying one of the regression trees to a each set of new values for the set of said at least one attributes to develop a predicted value for the dependent variable for each of the new records.

28. An article of manufacture as recited in claim 24, wherein the step of forming employs one vector for each attribute, said one vector having a non-zero coefficient only for values of said each attribute.

29. An article of manufacture as recited in claim 24, wherein the step of testing is performed on records in the training set not included in said at least one subset.

30. An article of manufacture as recited in claim 24, wherein the step of calculating includes;
   (a) initializing an enhancing vector set to empty;
   (b) choosing a next pair of distinct leaf nodes;

(c) determining if the next pair satisfies a usage criterion;

(d) repeating steps (b) and (c) until the usage criterion is satisfied;

(e) computing a separating set of vectors for the next pair;

(f) combining the separating set of vectors with the enhancing set of vectors forming an adjusted set of vectors;

(g) repeating steps (b) through (f) for all pairs of leaf nodes; and (h) filtering all sets of vectors so as to form the modified vector set.

31. An article of manufacture as recited in claim 30, wherein the usage criterion is a minimum size for each leaf in the pair of leaf nodes.

32. An article of manufacture as recited in claim 24, wherein the phenomenon is related to a medical domain.

33. A computer program product comprising a computer usable medium having computer readable program code means embodied therein for causing forecast of a phenomenon, the computer readable program code means in said computer program product comprising computer readable program code means for causing a computer to effect:

providing a training set of records, each record having at least one attribute and a numeric value for a dependent variable representing a phenomenon;

forming an initial set of vectors of said at least one attributes;

applying hyperplanes which are orthogonal to the initial set of vectors to obtain a first regression tree for at least one subset of the training set;

testing whether the first regression tree meets a criterion; if criterion is not met:

calculating for at least a subset of pairs of leaf nodes on the regression tree a modified set of vectors;

creating a modified regression tree from the modified set of vectors; and forecasting the phenomenon employing a predicted value for said dependent variable by applying said modified regression tree to new values for said at least one attribute.

34. A computer program product as recited in claim 33, the computer readable program code means in said computer program product further comprising computer readable program code means for causing a computer to effect:

storing the modified regression tree;

testing whether the modified regression tree meets the criterion; and repeating the steps of calculating, creating, storing and testing until the modified regression tree meets the criterion.

35. A computer program product as recited in claim 34, the computer readable program code means in said computer program product further comprising computer readable program code means for causing a computer to effect:

choosing a best regression tree by examining each of the stored regression trees for a desired property, and selecting a best regression tree based on the results of the step of examining.

36. A computer program product as recited in claim 33, wherein the phenomenon is related to a financial domain.

37. A program storage device readable by machine, tangibly embodying a program of instructions executable by the machine to perform method steps for causing forecast of a phenomenon, the method step comprising:

providing a training set of records, each record having at least one attribute and a numeric value for a dependent variable representing a phenomenon;

forming an initial set of vectors of said at least one attributes;

applying hyperplanes which are orthogonal to the initial set of vectors to obtain a first regression tree for at least one subset of the training set;

testing whether the first regression tree meets a criterion; if criterion is not met:

calculating for at least a subset of pairs of leaf nodes on the regression tree a modified set of vectors;

creating a modified regression tree from the modified set of vectors; and forecasting the phenomenon employing a predicted value for said dependent variable by applying said modified regression tree to new values for said at least one attribute.

38. A method as recited in claim 10, wherein the the step of combining includes adding.

39. A method as recited in claim 1, further comprising employing the absolute difference between the actual value and the predicted value for the dependent variable is used as the regression error for an application regarding the phenomenon.

* * * * *